US008531758B2

(12) United States Patent
van Lieshout et al.

(10) Patent No.: US 8,531,758 B2
(45) Date of Patent: Sep. 10, 2013

(54) DEVICE COMPRISING A MULTILAYER STRUCTURE AND ROLLERS

(75) Inventors: Petrus Johannes Gerardus van Lieshout, Beek en Donk (NL); Erik van Veenendaal, Eindhoven (NL); Elgar Denys Kleijne, The Hague (NL); Volker Barnhart Verschoor, Eindhoven (NL)

(73) Assignee: Creator Technology B.V., Breda (NL)

( * ) Notice: Subject to any disclaimer, the term of this patent is extended or adjusted under 35 U.S.C. 154(b) by 418 days.

(21) Appl. No.: 12/596,336

(22) PCT Filed: Apr. 15, 2008

(86) PCT No.: PCT/NL2008/050211
§ 371 (c)(1),
(2), (4) Date: Feb. 17, 2010

(87) PCT Pub. No.: WO2008/127103
PCT Pub. Date: Oct. 23, 2008

(65) Prior Publication Data
US 2010/0134873 A1    Jun. 3, 2010

Related U.S. Application Data

(60) Provisional application No. 60/912,075, filed on Apr. 16, 2007.

(51) Int. Cl.
*G02B 26/00*    (2006.01)
(52) U.S. Cl.
USPC .......................................................... 359/296

(58) Field of Classification Search
USPC ......... 359/296, 237, 245, 265–275; 345/107, 345/105; 347/112; 361/600, 679.01
See application file for complete search history.

(56) References Cited

U.S. PATENT DOCUMENTS

| 5,884,424 | A | 3/1999 | Smith |
| 6,269,225 | B1 | 7/2001 | Sato et al. |
| 6,333,754 | B1 * | 12/2001 | Oba et al. ....................... 347/112 |
| 6,498,597 | B1 * | 12/2002 | Sawano ....................... 345/107 |

(Continued)

FOREIGN PATENT DOCUMENTS

| CN | 1164106 A | 11/1997 |
| GB | 1 241 033 A | 7/1971 |

(Continued)

OTHER PUBLICATIONS

International Search Report dated Jul. 17, 2008 for PCT/NL2008/050211.

(Continued)

*Primary Examiner* — Tuyen Tra

(57) ABSTRACT

The invention relates to a device (35) comprising a multilayered structure (35a) with a first portion and a second portion wherein the first portion is conceived to be rolled about a first roller (38), said device comprising a second roller (39) for receiving the second portion for at least partially counteracting the effects of mechanical strain induced in the multilayered structure upon said rolling. The first roller (38) is rotated in a first direction, whereby the second roller (39) is rotated in a second direction. Preferably, the diameters of the first roller (38) and the second roller (39) are equal. Alternatively, the edge portions A, B of the multilayer structure (34a) are suitably interconnected by stoppers (33a, 33b) for preventing creeping.

13 Claims, 11 Drawing Sheets

(56) References Cited

U.S. PATENT DOCUMENTS

| | | | |
|---|---|---|---|
| 6,655,788 B1 * | 12/2003 | Freeman | 347/58 |
| 7,181,979 B1 * | 2/2007 | Lin et al. | 73/852 |
| 7,324,264 B2 * | 1/2008 | Aylward et al. | 359/296 |
| 2004/0212582 A1 | 10/2004 | Thielemans | |

FOREIGN PATENT DOCUMENTS

| | | |
|---|---|---|
| JP | 57-060368 | 4/1982 |
| JP | 09-216465 | 8/1997 |
| JP | 11-095688 | 4/1999 |
| JP | 2002-082646 | 3/2002 |
| JP | 2004-279867 | 10/2004 |
| WO | WO 2005/114309 A | 12/2005 |

OTHER PUBLICATIONS

Japan Patent Office, Office Action, Patent Application Serial No. 2010-503997, Oct. 30, 2012, Japan.

China Patent Office, Office Action, Patent Application Serial No. 200880016546.9, Mar. 22, 2013, China.

* cited by examiner

DEVICE COMPRISING A MULTILAYER STRUCTURE AND ROLLERS

FIELD OF THE INVENTION

The invention relates to a device comprising a multilayer structure with a first portion and a second portion wherein the first portion is conceived to be wound about a first roller.

BACKGROUND OF THE INVENTION

An example of a device as is set forth in the opening paragraph relates to an electronic apparatus comprising a flexible, notably rollable display. Rollable displays consist of several layers of suitable materials laminated on top of each other. When bending or rolling such a layer stack, creep and/or buckles can arise due to length differences between layers on the inside and outside of the curvature. This phenomenon appears particularly when, as shown in FIG. 1 ("creep"), an edge portion of the multilayer 3 is being held stationary with respect to a point of attachment to a part 7 of the device.

Creep and resulting misalignment between an upper and lower laminate can also occur when a stack of two laminates is bent. The laminate at the inside of the curvature needs less length and will therefore extend beyond the edge of the outer laminate. Buckling (local delamination defects) can occur when the same laminate stack, this time being stationary arranged at both ends with respect to some parts 8, 9 of the device, is bent (see, FIG. 1 "buckling"). Now the superfluous length of the inner laminate causes a buckle that compensates for the length difference. These phenomena will be discussed in more detail with reference to FIG. 1.

It is a disadvantage of a known device that the durability and/or functionality of the multilayer structure are reduced due to damages to the multilayer structure as a consequence of creeping and/or buckling.

SUMMARY OF THE INVENTION

It is an object of the invention to provide a device as is set forth in the opening paragraph wherein reliability of the device is improved.

To this end the device according to the invention comprises a second roller for receiving a second portion for at least partially counteracting the effects of mechanical strain induced in the multilayer structure upon said winding.

The technical measure of the invention is based on the insight that by applying different rolling strategies, creep and/or buckling problems can be minimized. The multilayer structure comprises a suitable number of material layers laminated on top of each other. For example, in cases when the multilayer structure comprises a display, the multilayer structure may comprise a flexible layer, notably an electrophoretic material, a binder, an adhesive sandwiched between two plastic substrates, for example of 25 micrometers each. Applying proper rolling strategies can increase durability of the device due to the fact that creep, either in the roll direction or perpendicular to the roll direction, is substantially minimized leading to improved reliability of the device when the multilayer structure is repetitively rolled up and unrolled, or kept rolled-up for a prolonged time. In addition, the respective alignment of the layers forming the multilayer structure is not altered during rolling up and unrolling improving the performance of the device as a whole. In other words the first roller supporting the first portion of the multilayer structure wound thereon and the second roller supporting a second portion of the multilayer structure wound thereon mechanically cooperate with each other. This feature is particularly advantageous for flexible displays, for example displays comprising a material having electrophoretic principles. Alternatively or additionally, this feature is advantageous for flexible color displays having a filter which substantially may not be displaced within the multilayer structure with respect to other structures. A rollable/flexible color display has a display effect layer, reflecting or emitting white light, combined with a color filter layer. Colored sub-pixels of the display are arranged into rows or columns in a roll-up direction. Suitable embodiments of the flexible color displays are discussed with reference to FIGS. 7-11.

Preferably, the rollers are arranged to roll the multilayer structure with the same surface facing in the same direction. In this case the rollers will be rolling in the opposite directions as observed from the outside. In a further embodiment the first roller and the second roller are wound in the same direction as observed from the outside. In this case the inward and outward surfaces on both rollers will be different. It is noted that the proposed rolling geometry is particularly beneficial for electronic devices comprising flexible, notably rollable displays, in particular color displays because the color filter has to stay accurately aligned to a pixelated backplane.

In a further embodiment of the device according to the invention the multilayer structure extends freely along a path between the first roller and the second roller, said path being selected to counteract net longitudinal shifts between the layers forming the multilayer. This embodiment is found to be particularly suitable for counteracting net creep. This feature will be discussed in more detail with reference to FIG. 5.

In a further embodiment of the device according to the invention the device comprises a multilayered structure with a first portion comprising a first edge and a second portion comprising a second edge wherein the first portion is conceived to be rolled about a first roller, whereby layers forming the multilayered structure are fixed at least in the area of the first edge and the second edge.

This particular embodiment is easy to implement and provides simple and reliable means to counteract creeping thereby improving reliability of the device as a whole, as well as durability due to the fact that the respective layers forming the multilayer do not shift with respect to each other during rolling and unrolling.

DETAILED DESCRIPTION

Figure 1:
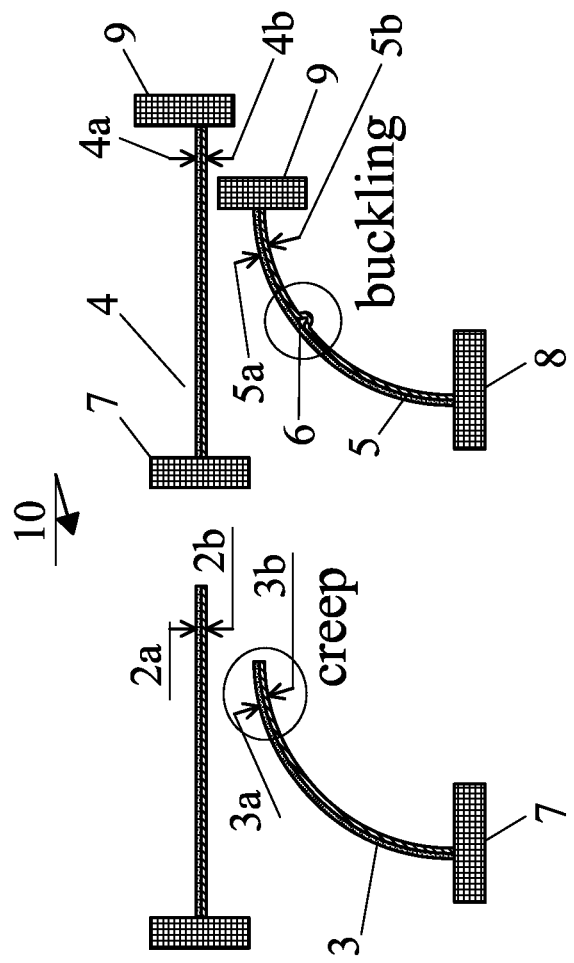
FIG. 1 presents a schematic illustration of creep and buckling phenomena.

FIG. 1 presents a schematic illustration 10 of creep and buckling phenomena. These effects are illustrated using a multilayered structure 2, 4 comprising two layers. It should be appreciated that this embodiment is strictly illustrative, leaving the option open for using a multilayer structure with more than two layers. The layers 2a, 2b, respectively 4a, 4b are preferably laminated to each other; however, other adhesion or co-planarization principles are possible. It is also noted that also the left-hand side embodiment refers to the effect of creeping whereby two adjacent points 2a, 2b within a suitable multilayer stack are displaced with respect to each other, see 3a, 3b, due to the relaxation of strain upon bending 3. Creep phenomenon is particularly pronounced for a multilayer wherein the layers are fixed to each other at an extremity, for example when being kept in place by suitable parts of the device 7, 8, and 9.

Buckling phenomenon is illustrated for a situation when layers are fixed to each other at both ends by suitable parts 8, 9 of the device. For example, a roller whereto the multilayer is attached can serve as such part. In addition a suitable grip portion (not shown) which is used to unroll the multilayer structure can be such a portion 9. Buckling (local detachment defects) can occur when the same stack, notably a laminated stack, fixed at both ends, is bent. Now the superfluous length of the inner laminate causes a buckle 6 that compensates for the length difference. It is noted that the adjacent points 5a, 5b keep their relative positions.

Figure 2:
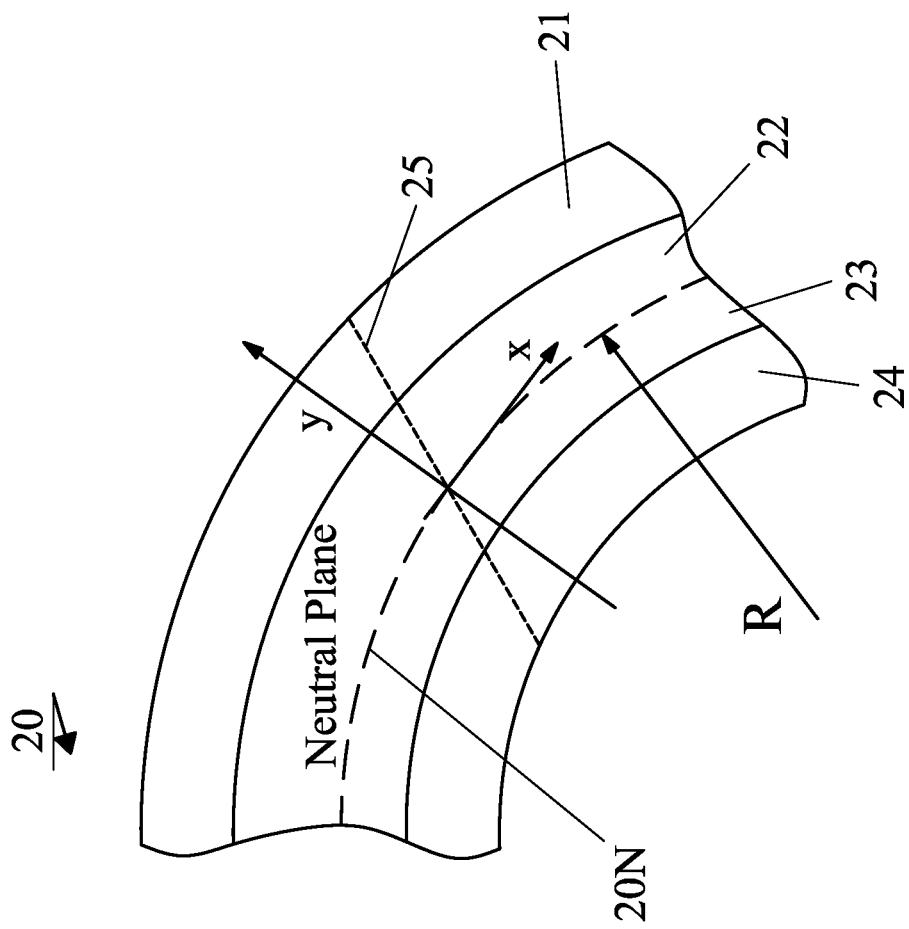
FIG. 2 presents a schematic illustration of strain in a bent multilayer structure.

FIG. 2 presents a schematic illustration of strain in a bent multilayer structure. In this example an isotropic bar 20 is bent over a radius R. Internal strain, being tensile or compressive, is caused in accordance with line 25. The inner layers 24, 23 are in a state of compression which gradually transforms into a state of tension for the layers 22, 21. The neutral plane 20N is defined as a line or a section of a plane wherein no strain and no tension occurs. The strain profile is independent of material properties of the layers and solely depends on the bending radius and a displacement $\Delta y$ in a transverse direction y across the stack 20. For a laminate the plate comprises multiple layers having different properties. This does not influence the strain profile; however, the position of the neutral line 20N is determined by the material properties. A significant compliant middle layer can result in a certain length at the end of the roll where the laminate rearranges back to the original (undeformed) state with a zero strain profile.

Figure 3:
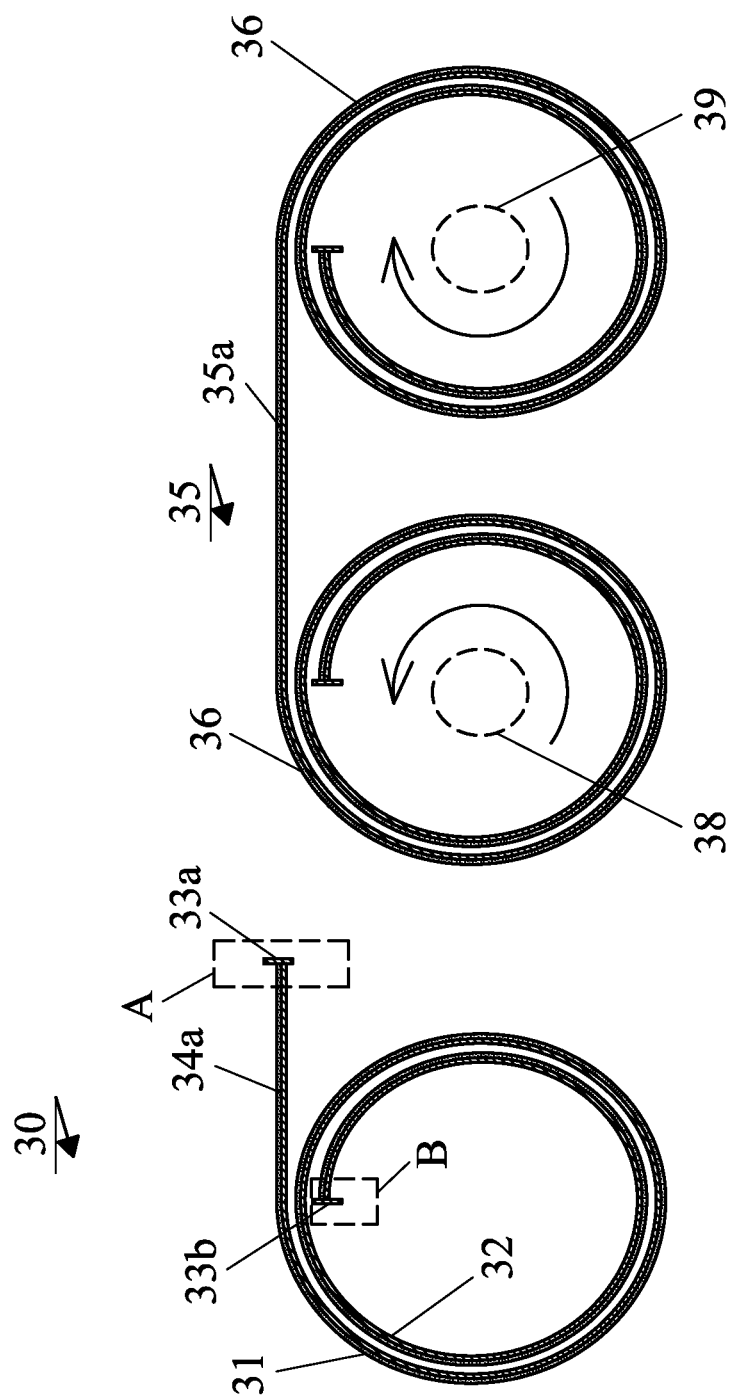
FIG. 3 presents a schematic view of an embodiment of the device according to the invention.

FIG. 3 presents a schematic view of an embodiment of the device according to the invention. In accordance to the technical measure of the invention the device 35 comprises a first roller 38 and the second roller 39 about which respective portions of the multilayer structure 35a are wound. The first roller 38 is rotated in a first direction, whereby the second roller 39 is rotated in an opposite direction. This results in the outer surface 36 always being at the outer side of each roller 38 and 39. Preferably, the diameters of the first roller 38 and the second roller 39 are equal. This results in a substantial reduction of the effects of strain in respective portions of the multilayer structure 35a. The roller arrangement of FIG. 3 is suitable to counteract the creeping phenomenon. It is noted that it is sufficient to suitably interconnect layers at both edges A, B of the multilayer structure for preventing creeping, like is shown in embodiment 30 of FIG. 3. In this case the terminal portions comprise suitable stoppers 33a, 33b arranged to prevent mutual displacement of the layers 31, 32 during rolling. For example, the stoppers may be integrated in the multilayer structure. Embodiments of suitable stoppers comprise extra strong lamination, fastening means, like pins, slots, clamps, glue seams, etc. This effect can be reached also by suitably rolling subsequent layers of the multilayer structure on each other so that the individual layers are being fixed to each other by application of the rolling force.

It is preferable to use such stoppers in combination with the embodiment of the display 35, counteracting the effects of strain even more effectively. Preferably, such embodiment is combined with an embodiment discussed with reference to FIG. 4.

Figure 4:
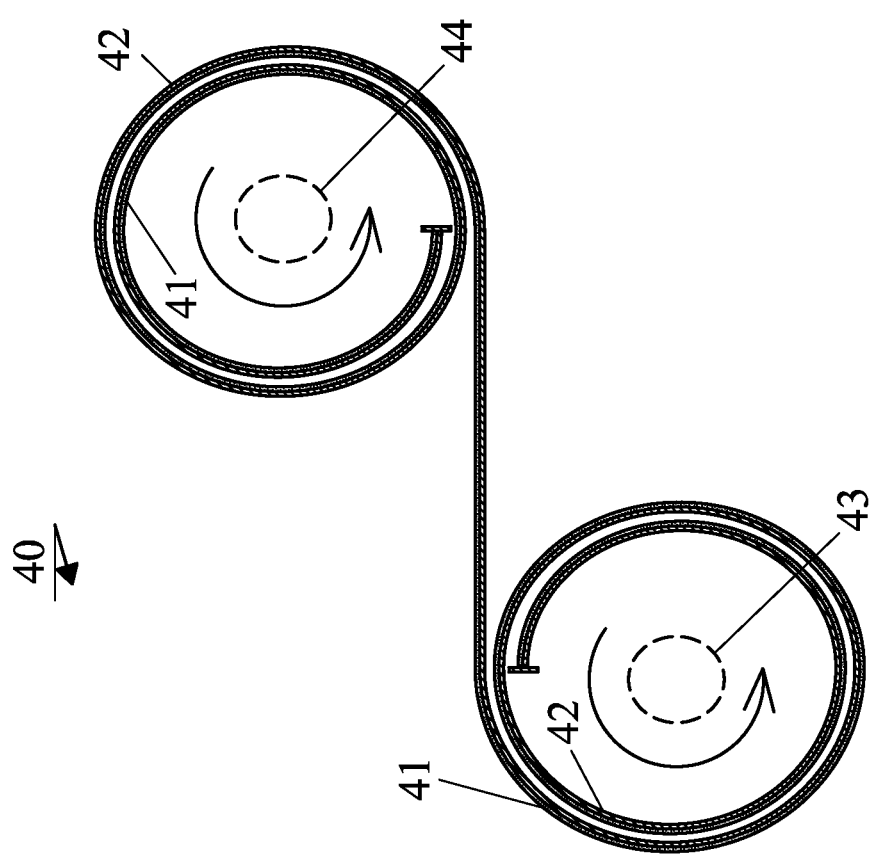
FIG. 4 presents a schematic view of a further embodiment of the device according to the invention.

FIG. 4 presents a schematic view of a further embodiment of the device according to the invention. In this particular embodiment of the device 40 according to the invention the first roller 43 is arranged to rotate in the same direction as the second roller 44. In this case the outer layer 41 at the position of the first roller 43 becomes an inner layer at the position of the second roller 44. The rollers 43 and 44 are arranged to cause the potential creep shift being built up in a portion of the multilayer structure associated with the roller 44 to be in an opposite direction and, therefore, to counteract the potential creep shift being built up in the portion associated with the roller 43. This has an additional advantageous effect that the potential creep is divided over the two rollers 43, 44. Preferably, for optimal compensation of the creep shift, the rollers 43, 44 should be selected of the same diameter. Alternatively, they may be of different diameter, provided a number of revolutions of the multilayer structure on a roller with a smaller diameter is smaller. This is explained by the fact the creep shift is proportional to an increment of the path an external layer has to travel upon bending. Due to this arrangement of the roller's geometry also buckling effects are counteracted.

Figure 5:
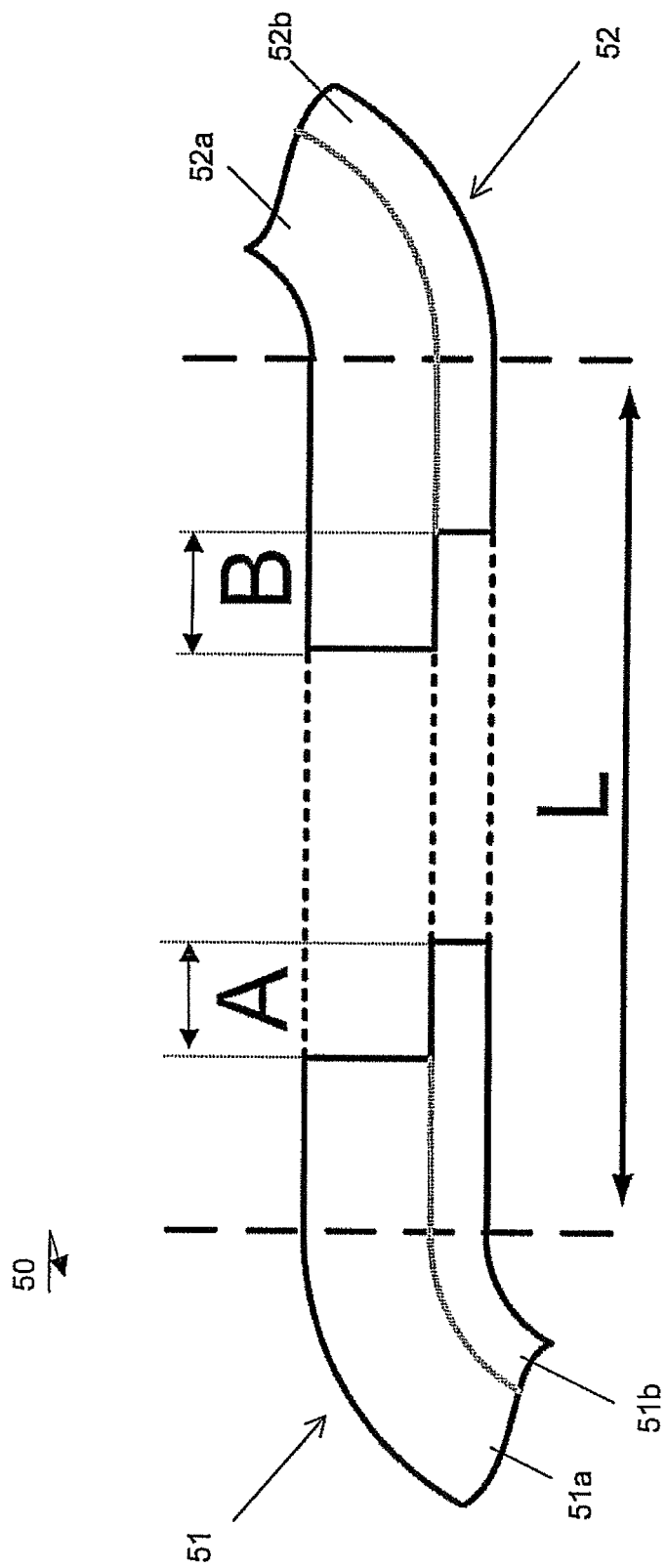
FIG. 5 presents a schematic view of a detail of an embodiment of the device of FIG. 4.

FIG. 5 presents a schematic view of a further embodiment of the device according to the invention. Hereby a portion of the multilayer structure 50 comprising layers 51a, 51b, respectively 52a, 52b is shown, said portion being positioned between terminal portions 51, 52 being wound around respective rollers (not shown). In the case of creep, the length differences at positions A and B in FIG. 5, caused by the relief of strain in the rolled portion, are assumed to be capable of driving the creep all the way through the unsupported multilayer, notably a film, without the strain which is present in the rolled part of laminate. This depends on the material properties, bending radius and the length of the freestanding part L. In addition the laminate must creep between the same layers in order to have matching profiles. Provided with the assumption that the laminate will creep as depicted in FIG. 5, the solution of FIG. 4 will have an effect of buckle prevention in the freestanding part and the rolled up portions. When the geometry of the rollers is suitably selected the creep areas A and B in the portion L are accurately compensated in net terms relieving the overall strain in the multilayer structure 50. It is noted that substantially the same amount of creep (measured in length) is induced in opposite directions in both halves of the multilayer structure, notably a flexible display or the like. Therefore, the totally relaxed rolled-up state has no net length difference between the top and the bottom part of the multilayer structure. This creates the possibility to add end stoppers at both sides.

Figure 6:
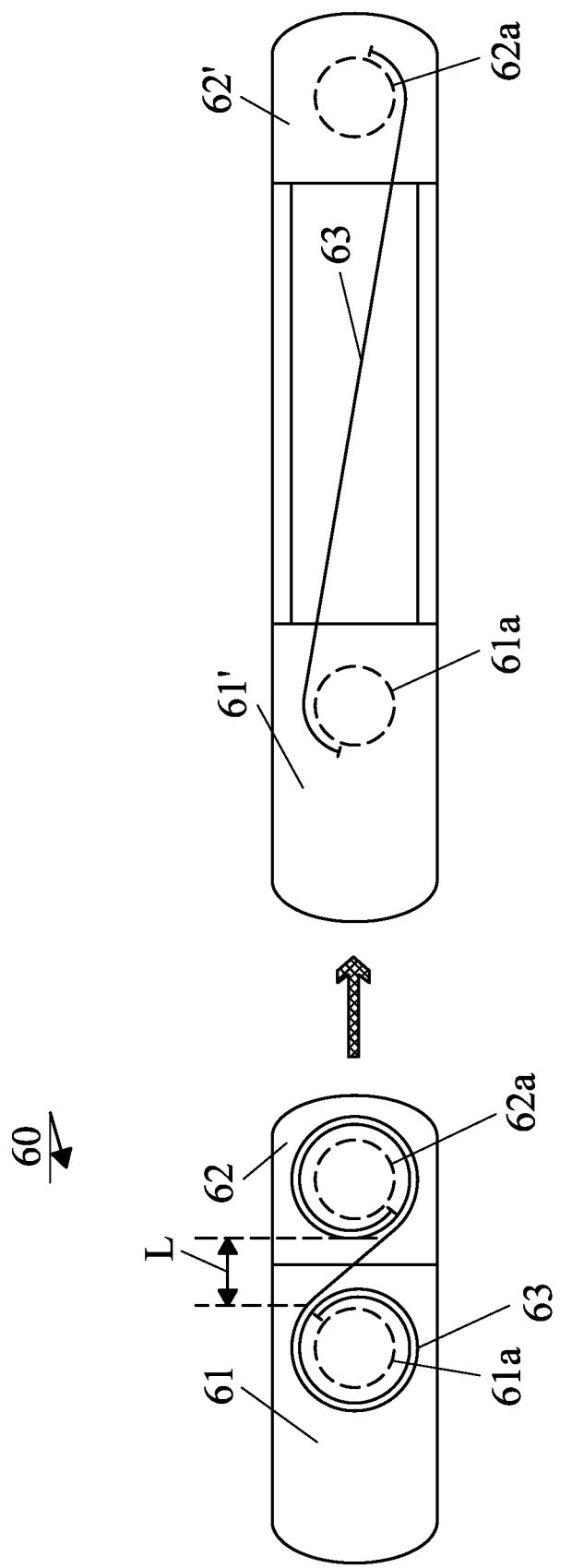
FIG. 6 presents a schematic view of an embodiment of a device according to the invention.

FIG. 6 presents a schematic view of an embodiment of a device 60 according to the invention. The device 60 preferably relates to an electronic device such as a portable telephone, a palmtop computer or any other hand operated device comprising a collapsible, notably a flexible display. The electronic device 60 in this case comprises a first portion of a housing 61 and a second portion of a housing 62, said portions of the housing being displaceable with respect to each other to respective positions 61', 62'. The flexible display 63 is wound about the first roller 61a and the second roller 62a for compensating the relaxation effects of the internal strain caused by the rollers 61a, 62a. Although this embodiment is described with reference to the rollers arranged to rotate in the same direction, it will be appreciated that any embodiment discussed with reference to FIG. 3 is applicable.

Figure 7:
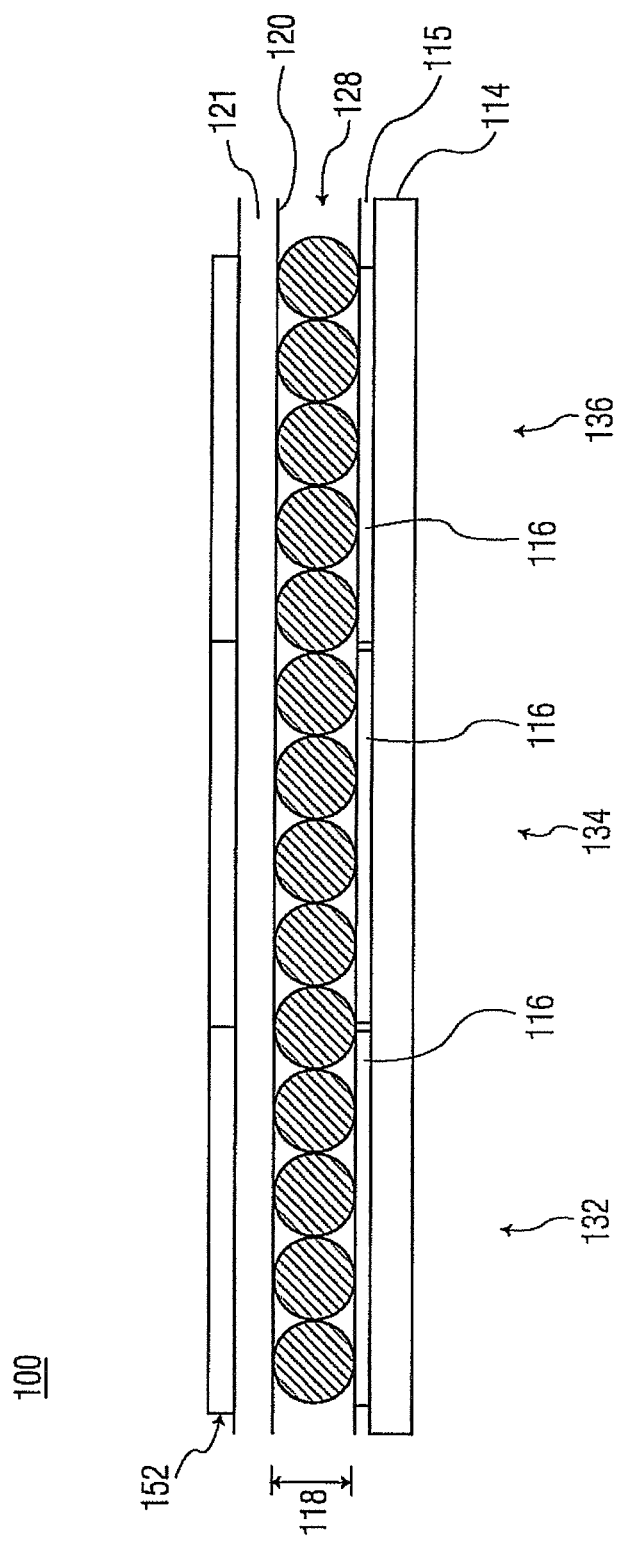
FIG. 7 presents a schematic view of an embodiment of a multilayer structure for use in the device according to the invention.

FIG. 7 presents a schematic view of a multilayer structure for use in the device according to the invention. In this example a cross-sectional view of a conformable, flexible or roll up display 100 is shown in accordance with principles of one embodiment. A display effect layer 128 includes materials for the transmission and dispersion of light. In the embodiment of FIG. 7, the display effect layer 128 may include liquid crystal, an electrophoretic display medium or any other emitting or reflective material for guiding light to a viewer. A backplane substrate 114 may include a flexible polymer material on which an active matrix layer 115 is formed including sub-pixels 116 and other electronic components. These electronic components may include transistors (thin film transistors TFT), capacitors, conductive lines, etc. For simplicity only sub-pixels 116 are shown. For a back lit embodiment, light is passed through substrate 114 or other back end device to provide light through sub-pixels 116. Other embodiments may include reflective displays where light is reflected from sub-pixels 116 from the viewing side of the sub-pixels 116. A cell gap 118 is filled with a display effect material, such as, e.g., liquid crystal, electrophoretic display medium (e.g., the capsules contain electrophoretic ink from the manufacturer E Ink Corporation) or other display effect material which is responsive to pixels 116. For example, when activated the pixels 116 cause orientation of the liquid crystal or a change in the E ink capsules as is known in the art. A substrate 121 may include a common electrode 120 formed thereon. The common electrode 120 cooperates with the sub-pixels 116 to orient or adjust the state of the adjacent display effect material. A color filter layer 152 is provided as part or substrate 121.

Figure 8:
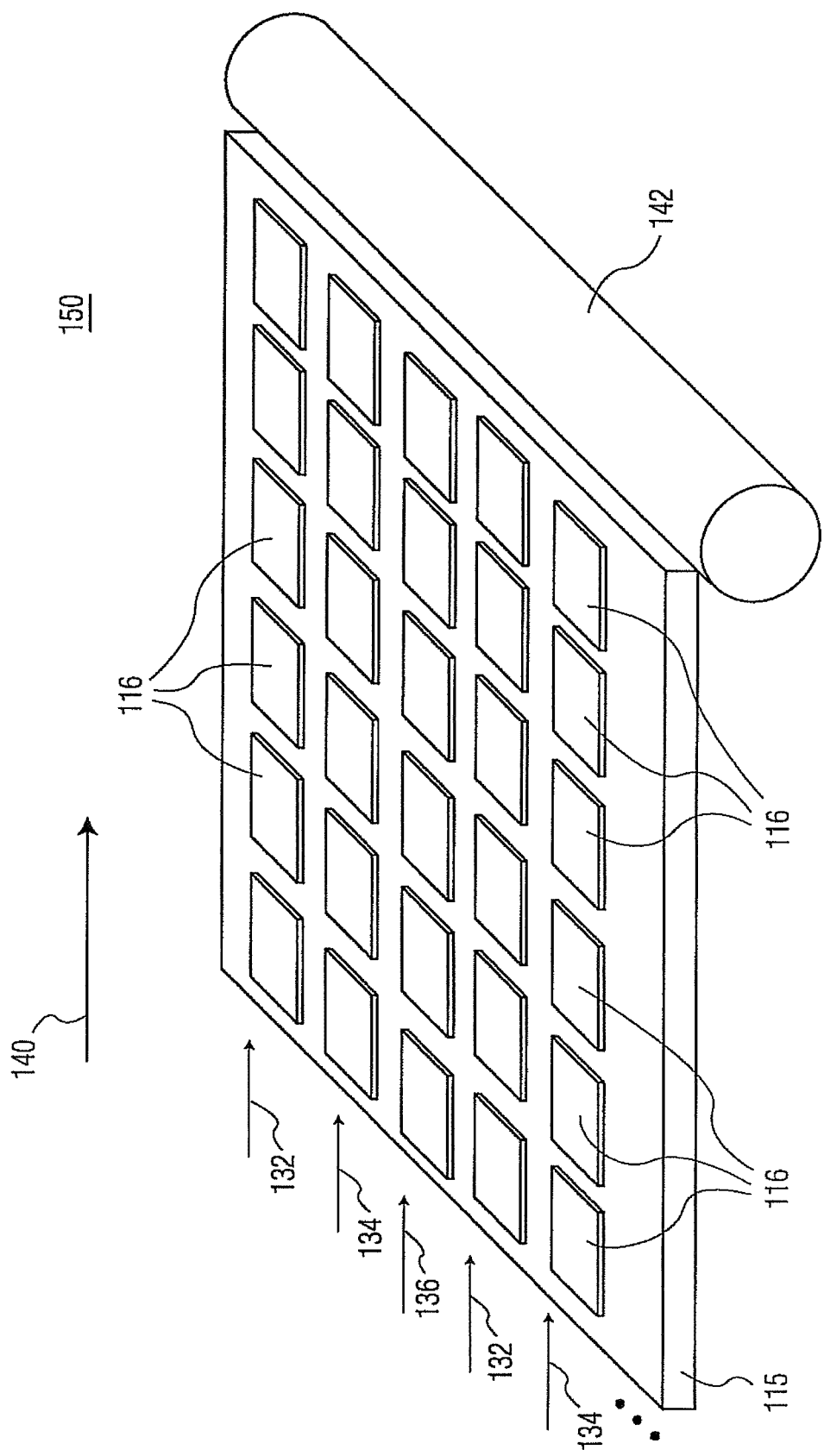
FIG. 8 presents a schematic view of a further embodiment of a multilayer structure for use in the device according to the invention.

Referring to FIG. 8, a sub-pixel array 150 includes an arrangement of sub-pixels 116 which are configured to be assigned same color values in a linear relationship, e.g., in same rows or columns 132, 134 and 136 (referred to hereinafter as rows for ease of reference). Each row 132, 134 and 136 corresponds to a same color. Colored sub-pixels 116 of the display 100 are arranged into rows in a roll-up direction 140 (a roll 142 is shown in this view for illustrative purposes). The three color rows (e.g., Red 134, Green 136 and Blue 138) repeat across the display. While three color components are illustratively depicted and described, other arrangements may be provided. For example, in one embodiment, four row types may be employed (e.g., Red, Green, Blue and White (RGBW)). Each row (132, 134, and 136) is oriented in the roll up direction 140, which is transverse to a longitudinal axis of a spool or roll 142.

Figure 9:
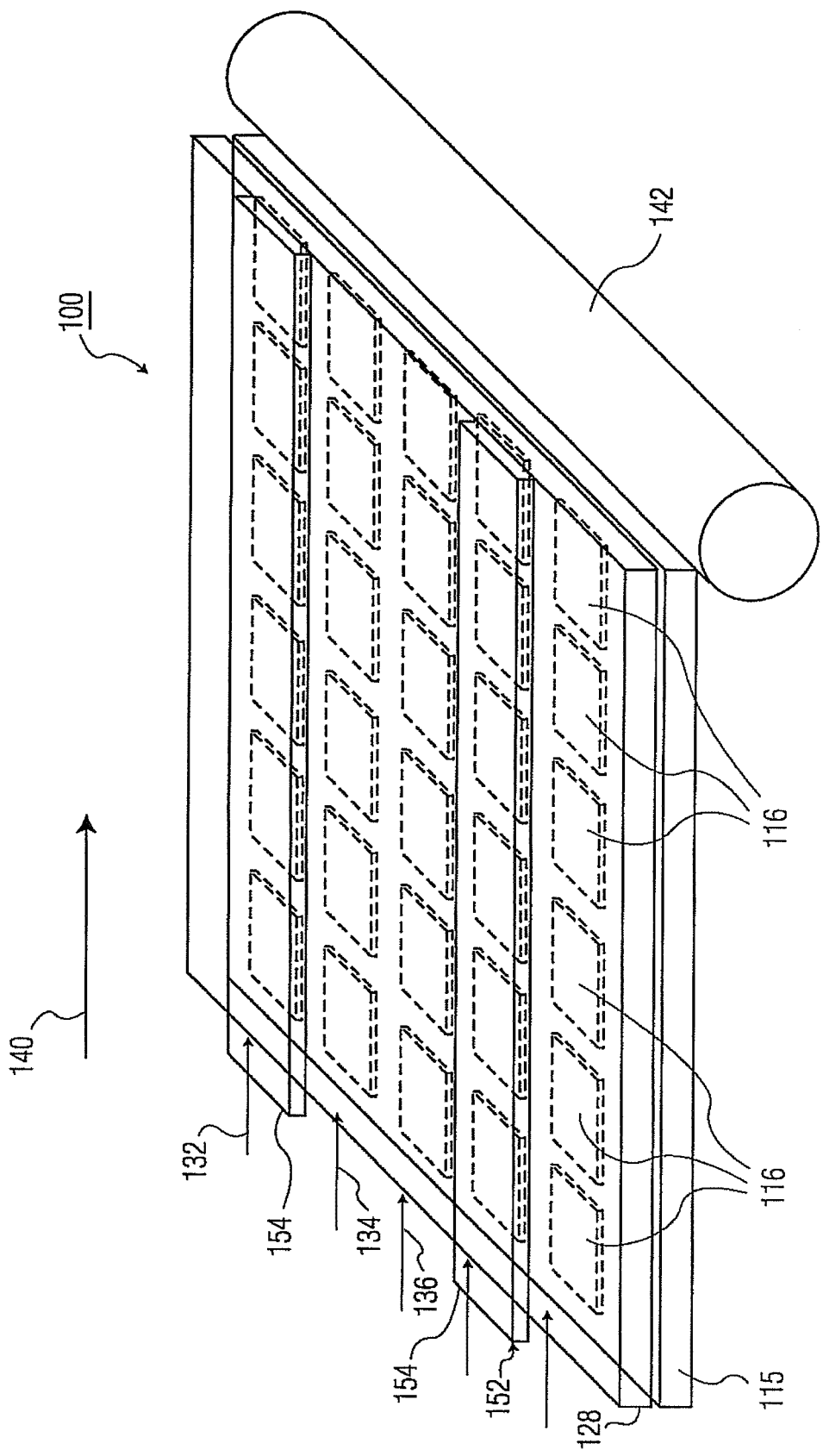
FIG. 9 presents a schematic view of a further embodiment of a multilayer structure for use in the device according to the invention.

Referring to FIG. 9, the rollable color display 100 has the display effect layer 128 formed and a color filter layer 152 is to be placed in alignment with the sub-pixels 116 on an active/passive matrix layer 115. The color filter layer 152 may be fabricated and placed in a plurality of different ways. The color filter layer 152 may be formed by deposition and photolithographic patterning over the display effect layer 128. For example, a first color is deposited followed by a patterning process which forms longitudinal stripes 154 of the first color in the direction of the roll up 140. Each stripe 154 of the first color corresponds to and is aligned in a direction transverse to the roll up direction 140. Similar processing is performed to define stripes 154 for the other color filters corresponding to the sub-pixels 116 of that color. Color filters may include materials of between about 100 nm and about 10 microns in thickness and are preferably polymeric materials, which may be known.

Figure 10:
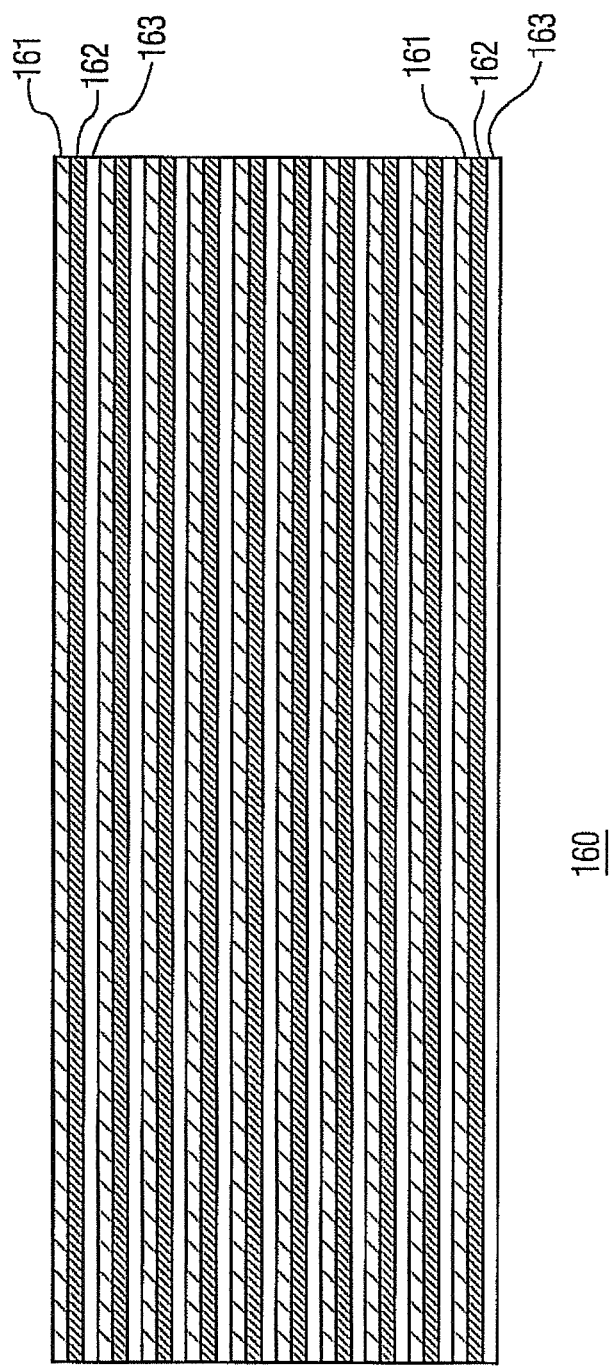
FIG. 10 presents a schematic view of a further embodiment of a multilayer structure for use in the device according to the invention.

In alternate embodiments, a color filter layer 152 may be formed by spin coating, spray coating, evaporating, doctor blading or similar deposition methods. In one embodiment, the color filter layer is formed as a sheet having alternating color components as illustratively shown in FIG. 10. A color filter sheet 160 may be formed in a single sheet having different colors 161-163 alternating thereon. Sheet 160 may include a thin polymeric material fabricated in an extrusion process. Sheet 160 may be glued or otherwise adhered to the display 100 (FIG. 3) to provide color filter layer 152.

Advantageously, the color filter layer 152 need only be concerned about a sub-pixel pitch in a direction transverse to the roll-up direction 140. This makes alignment much easier between the sub-pixels 116 and the color filters. In the present disclosure, colored sub-pixels 116 are arranged in horizontal stripes. This can have implications on the arrangement of rows and columns on the display and thereby the performance needed from driving or backplane electronics.

Figure 11:
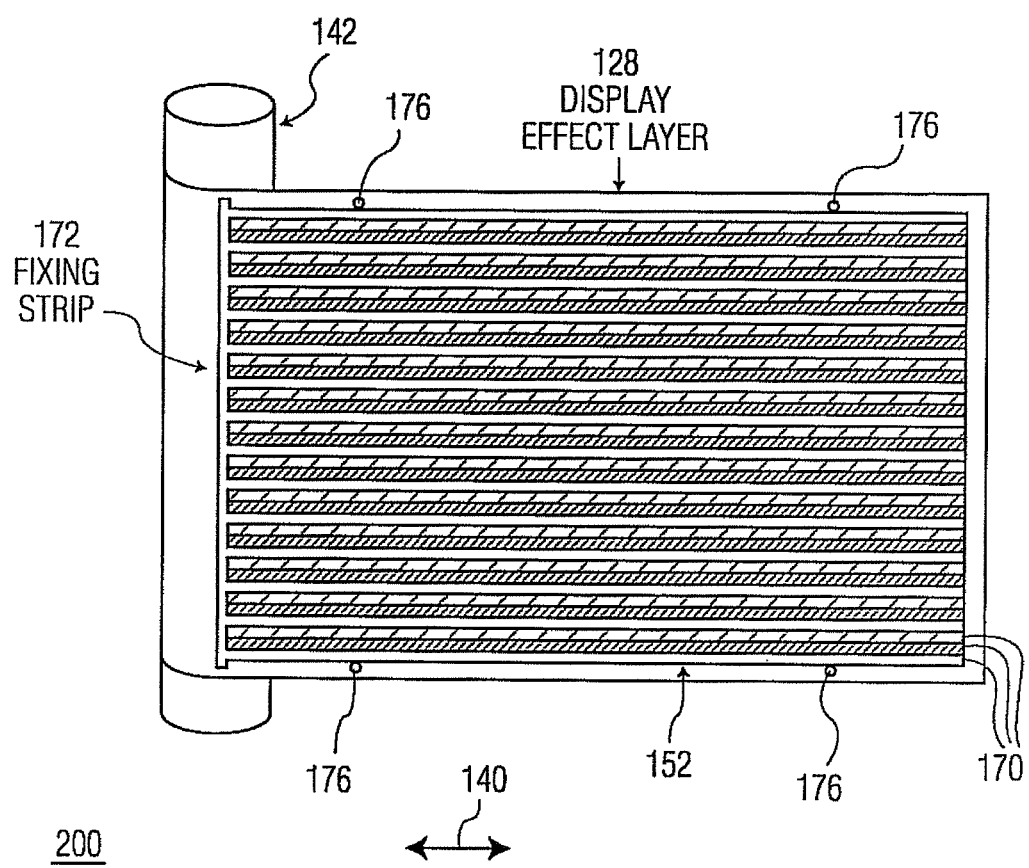
FIG. 11 presents a schematic view of a further embodiment of a multilayer structure for use in the device according to the invention.

Referring to FIG. 11, color filter stripes 170 may be secured using a fixing strip 172 along one of the edges perpendicular to the rolling direction 140. The fixing strip 172 binds the display effect layer 128 and color filter layer 152 along one of the non-rolling display edges. As described, brightness decreases and/or color errors caused by alignment problems during display bending or rolling are avoided by patterning color filters into continuous stripes 170 which extend in the roll up direction 140. A radius difference between the display effect layer 128 and the color filter layer 152 is substantially eliminated since misalignment between the color filters and the underlying pixels is eliminated. No brightness decrease or color errors will occur.

FIG. 11 illustratively shows an RGB (red, green, blue) color display 200 according to one embodiment. However, arrangements other than RGB, such as RGBW RBG White) or CMY (Cyan, Magenta, Yellow) may be employed. Black stripes (boot shown) may also be employed between the colored stripes 170 to separate or delineate the stripes 170. It should be understood that pixels comprised of three sub-pixels are arranged together such that three adjacent rows cover the three sub-pixels needed for a pixel image. The color filter stripes need not continuously alternate, e.g., RGB; RGB, etc.; instead other arrangement are possible, e.g., RGB, BGR, RGB, so that the same colors in this case B and R can be formed adjacent to one another. This may ease tolerances and improve manufacturability.

Depending on the lamination glue properties of fixing strip 172, fixing strip may be employed to fix the display effect layer 128 and color filter layer 152 along one of the non-rolling display edges to prevent un-wanted drifting of the two layers with respect to each other. Fixing strip 170 may be employed along one side of the display 200, and permit the movement of color filter layer 152 relative to the display effect layer without color errors due to bending or roll up. Other arrangements are also possible, such as, e.g., employing one or more fixing spots 176 at opposite sides of the display 200.

It should be noted that every embodiment of the flexible displays discussed with reference to any of the FIGS. 7-11 may be rolled in according to the principles set-out in FIGS. 3, 4. Alternatively or additionally the flexible displays discussed with reference to any of the FIGS. 7-11 may be provided with edge stoppers as discussed with reference to embodiment 30 of FIG. 3.

It will be appreciated that although specific embodiments of the device according to the invention are discussed separately for clarity purposes, interchangeability of compatible features discussed with reference to isolated figures is envisaged. While specific embodiments have been described above, it will be appreciated that the invention may be practiced otherwise than as described. The descriptions above are intended to be illustrative, not limiting. Thus, it will be apparent to one skilled in the art that modifications may be made to the invention as described in the foregoing without departing from the scope of the claims set out below.

The invention claimed is:

1. A device comprising a multilayer structure with a first portion and a second portion wherein the first portion is adapted for rolling about a first roller, said device comprising a second roller for receiving the second portion such that the first portion is wound about the first roller and the second portion is wound about the second roller, and wherein the first roller and the second roller are rotatable in opposite directions, wherein the multilayer structure comprises a flexible display and a compliant middle layer for at least partially counteracting the effects of mechanical strain induced in the multilayered structure upon said rolling about the first roller.

2. A device according to claim 1, wherein the first portion comprises a first edge and the second portion comprises a second edge, and wherein layers forming the multilayered structure are mechanically interconnected at least in the area of the first edge and the second edge.

3. A device according to claim 1, wherein a diameter of the first roller substantially equals a diameter of the second roller.

4. A device according to claim 1, wherein the flexible display comprises a plurality of rows, each row being oriented in a roll up direction, which is transverse to a longitudinal axis of a spool or roll.

5. A device according to claim 4, wherein the display comprises electrophoretic material.

6. A device according to claim 5, said device being accommodated in a housing comprising a first portion and a second portion, said first portion being displaceably arranged with respect to the second portion, wherein the first roller is arranged in the first portion and the second roller is arranged in the second portion.

7. A device according to claim 4, said device being accommodated in a housing comprising a first portion and a second portion, said first portion being displaceably arranged with respect to the second portion, wherein the first roller is arranged in the first portion and the second roller is arranged in the second portion.

8. A device comprising a multilayered structure with a first portion comprising a first edge and a second portion comprising a second edge wherein the first portion is adapted for rolling about a first roller and a second roller for receiving the second portion, such that the first portion is wound about the first roller and the second portion is wound about a second roller, and wherein the first roller and the second roller are rotatable in opposite direction, wherein layers forming the multilayered structure are mechanically interconnected at least in the area of the first edge and the second edge, and wherein the multilayer structure comprises a flexible display and a compliant middle layer for at least partially counteracting the effects of mechanical strain induced in the multilayered structure upon said rolling about the first roller.

9. A device according to claim 8, wherein a diameter of the first roller substantially equals a diameter of the second roller.

10. A device according to claim 8, wherein the flexible display comprises a plurality of rows, each row oriented in a roll up direction, which is transverse to a longitudinal axis of a spool or roll.

11. A device according to claim 10, wherein the display comprises electrophoretic material.

12. A device according to claim 11, said device being accommodated in a housing comprising a first portion and a second portion, said first portion being displaceably arranged with respect to the second portion, wherein the first roller is arranged in the first portion and the second roller is arranged in the second portion.

13. A device according to claim 10, said device being accommodated in a housing comprising a first portion and a second portion, said first portion being displaceably arranged with respect to the second portion, wherein the first roller is arranged in the first portion and the second roller is arranged in the second portion.

* * * * *